(12) United States Patent
Rengarajan et al.

(10) Patent No.: US 10,470,082 B2
(45) Date of Patent: Nov. 5, 2019

(54) DATA GATHERING TO ENABLE THE OPTIMIZATION OF DISTRIBUTED WI-FI NETWORKS

(71) Applicant: Plume Design, Inc., Palo Alto, CA (US)

(72) Inventors: Balaji Rengarajan, Campbell, CA (US); Jian Lu, Los Gatos, CA (US); Kiran Edara, Cupertino, CA (US); Sameer Vaidya, Saratoga, CA (US); Hong Fan, San Jose, CA (US); William McFarland, Portola Valley, CA (US)

(73) Assignee: Plume Design, Inc., Palo Alto, CA (US)

(*) Notice: Subject to any disclaimer, the term of this patent is extended or adjusted under 35 U.S.C. 154(b) by 121 days.

(21) Appl. No.: 15/462,071

(22) Filed: Mar. 17, 2017

(65) Prior Publication Data

US 2017/0272977 A1    Sep. 21, 2017

Related U.S. Application Data

(60) Provisional application No. 62/310,589, filed on Mar. 18, 2016.

(51) Int. Cl.
*H04W 28/08* (2009.01)
*H04L 12/26* (2006.01)
(Continued)

(52) U.S. Cl.
CPC ........... *H04W 28/085* (2013.01); *H04L 41/12* (2013.01); *H04L 41/142* (2013.01);
(Continued)

(58) Field of Classification Search
CPC .............. H04W 28/085; H04W 24/02; H04W 28/0236; H04W 40/12; H04W 40/16;
(Continued)

(56) References Cited

U.S. PATENT DOCUMENTS 7,315,533 B2    1/2008 Theobold et al.
7,414,978 B2    8/2008 Lun et al.
(Continued)

FOREIGN PATENT DOCUMENTS

WO    2014073706 A1    5/2014

OTHER PUBLICATIONS

Jun. 27, 2017 International Search Report for International Application PCT/US2017/022883.
(Continued)

*Primary Examiner* — Obaidul Huq
(74) *Attorney, Agent, or Firm* — Clements Bernard Walker PLLC; Lawrence A. Baratta, Jr.

(57) ABSTRACT

Systems and methods for gathering data by an access point in a Wi-Fi system for optimization include periodically or based on command from a cloud-based system performing one or more of i) obtaining on-channel scanning data while operating on a home channel and ii) switching off the home channel and obtaining off-channel scanning data for one or more off-channels; and providing measurement data based on one or more of the on-channel scanning data and the off-channel scanning data to the cloud-based system for use in the optimization of the Wi-Fi system, wherein the measurement data comprises one or more of raw data and processed data.

19 Claims, 8 Drawing Sheets

(51) Int. Cl.

| | | |
|---|---|---|
| *H04L 12/727* | (2013.01) | |
| *H04W 24/02* | (2009.01) | |
| *H04W 28/02* | (2009.01) | |
| *H04W 40/12* | (2009.01) | |
| *H04W 40/16* | (2009.01) | |
| *H04W 84/18* | (2009.01) | |
| *H04L 12/24* | (2006.01) | |
| *H04W 40/22* | (2009.01) | |
| *H04L 12/751* | (2013.01) | |
| *H04W 84/12* | (2009.01) | |

(52) U.S. Cl.
CPC .......... *H04L 43/0858* (2013.01); *H04L 45/02* (2013.01); *H04L 45/121* (2013.01); *H04W 24/02* (2013.01); *H04W 28/0236* (2013.01); *H04W 40/12* (2013.01); *H04W 40/16* (2013.01); *H04W 40/22* (2013.01); *H04W 84/18* (2013.01); *H04W 84/12* (2013.01)

(58) Field of Classification Search
CPC ..... H04W 40/22; H04W 84/18; H04W 84/12; H04L 41/12; H04L 41/142; H04L 43/0858; H04L 45/02; H04L 45/121
USPC .................................................. 370/229, 230
See application file for complete search history.

(56) References Cited

U.S. PATENT DOCUMENTS

| | | | |
|---|---|---|---|
| 7,953,403 | B2 | 5/2011 | Nientiedt |
| 8,798,021 | B2 | 8/2014 | Mangalvedhe et al. |
| 9,060,279 | B2 | 6/2015 | Ganu et al. |
| 9,066,251 | B2 | 6/2015 | Madan et al. |
| 9,131,391 | B2 | 9/2015 | Madan et al. |
| 9,131,392 | B2 | 9/2015 | Madan et al. |
| 9,420,528 | B2 | 8/2016 | Madan et al. |
| 9,497,700 | B2 | 11/2016 | Madan et al. |
| 9,510,214 | B1 | 11/2016 | Balasubramaniam et al. |
| 9,516,579 | B1 | 12/2016 | Diner et al. |
| 2006/0258395 | A1 | 11/2006 | Cave et al. |
| 2007/0149172 | A1 | 6/2007 | Dickinson |
| 2007/0242621 | A1 | 10/2007 | Nandagopalan et al. |
| 2009/0257380 | A1 | 10/2009 | Meier |
| 2009/0279427 | A1 | 11/2009 | Ji et al. |
| 2009/0316585 | A1 | 12/2009 | Srinivasan |
| 2009/0323632 | A1 | 12/2009 | Nix |
| 2010/0118830 | A1 | 5/2010 | Stephenson et al. |
| 2010/0330919 | A1 | 12/2010 | Gurney et al. |
| 2011/0039554 | A1 | 2/2011 | Bims |
| 2011/0151886 | A1 | 6/2011 | Grayson et al. |
| 2011/0158089 | A1 | 6/2011 | Sambhwani et al. |
| 2011/0176434 | A1 | 7/2011 | Pandey et al. |
| 2011/0243013 | A1* | 10/2011 | Lee .................. H04W 24/10 370/252 |
| 2012/0002567 | A1 | 1/2012 | Sun et al. |
| 2012/0087268 | A1 | 4/2012 | Savoor et al. |
| 2012/0122503 | A1 | 5/2012 | Ma et al. |
| 2012/0257585 | A1 | 10/2012 | Sydor et al. |
| 2013/0201857 | A1 | 8/2013 | Bhargava et al. |
| 2013/0272285 | A1* | 10/2013 | Goldsmith .......... H04W 24/02 370/338 |
| 2014/0092765 | A1 | 4/2014 | Agarwal et al. |
| 2014/0126410 | A1 | 5/2014 | Agarwal et al. |
| 2014/0153428 | A1 | 6/2014 | Ponnuswamy |
| 2014/0328190 | A1* | 11/2014 | Lord ................. H04W 24/08 370/252 |
| 2015/0081888 | A1* | 3/2015 | Pham ............... H04L 43/0811 709/224 |
| 2015/0289142 | A1 | 10/2015 | Abeysekera et al. |
| 2016/0080949 | A1 | 3/2016 | Chandrasekhar et al. |
| 2017/0127373 | A1* | 5/2017 | Deshpande .......... H04W 64/00 |

OTHER PUBLICATIONS

Aruba Networks, Inc., Managing and Optimizing RF Spectrum for Aruba WLANs Version 1.0, Apr. 14, 2014. pp. 6-8, 10, 12, 29, 35.

Extended European Search Report dated Jul. 3, 2019.

Murty et al, "Dyson: An Architecture for Extensible Wireless LANS," May 14, 2010.

Sep. 24, 2019, Office Action and cited references issued for Japanese Patent Application No. 2018-568174.

* cited by examiner

DATA GATHERING TO ENABLE THE OPTIMIZATION OF DISTRIBUTED WI-FI NETWORKS

CROSS-REFERENCE TO RELATED APPLICATION(S)

The present patent/application claims priority to U.S. Provisional Patent Application No. 62/310,589, filed Mar. 18, 2016, and entitled "DATA GATHERING TO ENABLE THE OPTIMIZATION OF DISTRIBUTED WI-FI NETWORKS," the contents of which are incorporated by reference.

FIELD OF THE DISCLOSURE

The present disclosure generally relates to wireless networking systems and methods. More particularly, the present disclosure relates to data gathering to enable the optimization of distributed Wi-Fi networks.

BACKGROUND OF THE DISCLOSURE

Wi-Fi networks (i.e., Wireless Local Area Networks (WLAN) based on the IEEE 802.11 standards) have become ubiquitous. People use them in their homes, at work, and in public spaces such as schools, cafes, even parks. Wi-Fi provides great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. In fact, Wi-Fi has become the primary connection between user devices and the Internet in the home or other locations. The vast majority of connected devices use Wi-Fi for their primary network connectivity.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems. The first approach is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location. This approach is a fundamentally better approach to achieving better coverage. By placing even a single repeater node in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters. A fully interconnected mesh adds the ability for all the repeaters to be able to communicate with each other, opening the possibility of packets being delivered via multiple hops following an arbitrary pathway through the network.

State of the art mesh or repeaters systems still have many limitations. Because the systems depend on localized control, they configure themselves to use the same frequency for all the backhaul communication between the repeaters or mesh nodes. This creates a severe system capacity problem. Consider a system that requires three hops through the network to get its packet to the destination. Since all three hops are on the same frequency channel, and because only one Wi-Fi radio can transmit at a time on a given channel among devices that are in range (where range is determined by the long range of the lowest supported data rate), only one hop can be active at a time. Therefore, for this example, delivering a packet via three hops would consume three times the airtime on the one channel as delivering the packet directly. In the first hop, when the packet is moving from the Wi-Fi gateway to the first mesh node, all the other links in the house would need to stay silent. Similarly, as the packet is later sent from the first mesh node to a second mesh node, no other Wi-Fi devices in the home could transmit. Finally, the same would be true as the packet is moved from the second mesh node to the final destination. In all, the use of three hop repeating has reduced the network capacity by a factor of three. And, as with the case of a single access point, the repeater or mesh approach does nothing to help with the problems of interference or congestion. As before, the technique actually increases interference, as a single packet transmission becomes three separate transmissions, taking a total of 3× the airtime, generating 3× the interference to neighboring Wi-Fi networks.

BRIEF SUMMARY OF THE DISCLOSURE

In an exemplary embodiment, a method for gathering data by an access point in a Wi-Fi system for optimization includes periodically or based on command from a cloud-based system performing one or more of i) obtaining on-channel scanning data while operating on a home channel and ii) switching off the home channel and obtaining off-channel scanning data for one or more off-channels; and providing measurement data based on one or more of the on-channel scanning data and the off-channel scanning data to the cloud-based system for use in the optimization of the Wi-Fi system, wherein the measurement data includes one or more of raw data and processed data. When the measurement data is the processed data, the method can further include determining a division of time that the home channel is divided based on a combination of direct measurements and computations based on the direct measurements. When measurement data is the processed data, the method can further include determining delays of packets over the Wi-Fi system through one of direct measurements and statistics of delay at the access point. The measurement data can include a plurality of Received Signal Strength Indicators (RSSI), achievable data rates, capacity, load, error rates, delays, interference, and fractions of time spent transmitting and receiving.

The switching off can be determined based on a load of the access point. The method can further include notifying other access points in the Wi-Fi system of the switching off. The access point can be lightly loaded compared to at least one additional access point in the Wi-Fi system, and wherein the access point can be configured to perform the obtaining off-channel scanning data for the at least one additional access point. The access point for the off-channel scanning data can send probe requests for a particular Service Set Identifier (SSID) to measure signal strengths to a particular neighbor to reduce the number of probe responses received. The access point for the off-channel scanning data can send frames that spoof another in-network Basic Service Set Identifier (BSSID) to elicit responses from neighboring access points and clients. The method can further include receiving configuration data from the cloud-based system based on the optimization, wherein the providing measurement data is performed over a statistics channel, and the receiving configuration data is performed over a configuration channel different from the statistics channel. The one or more of the on-channel scanning data and the off-channel scanning data can be obtained at different channel bandwidths. The method can further include causing Wi-Fi client devices to move to other access points prior to the switching off.

In a further exemplary embodiment, an access point in a Wi-Fi system configured to gather data for optimization includes a plurality of radios communicating on the Wi-Fi system; and a processor communicatively coupled to the plurality of radios and configured to: periodically or based on command from a cloud-based system cause the one or more radios to one or more of i) obtain on-channel scanning data while operating on a home channel and ii) switch off the home channel and obtain off-channel scanning data for one or more off-channels; and provide measurement data based on the on-channel scanning data and the off-channel scanning data to the cloud-based system for use in the optimization of the distributed Wi-Fi system, wherein the measurement data includes one or more of raw data and processed data. The processor can be further configured to notify other access points in the Wi-Fi system of the switching off. The access point can be lightly loaded compared to at least one additional access point in the Wi-Fi system, and wherein the access point can be configured to obtain the off-channel scanning data for the at least one additional access point. The access point for the off-channel scanning data can send probe requests for a particular Service Set Identifier (SSID) to measure signal strengths to a particular neighbor to reduce the number of probe responses received. The access point for the off-channel scanning data can send frames that spoof another in-network Basic Service Set Identifier (BSSID) to elicit responses from neighboring access points and clients. The processor can be further configured to receive configuration data from the cloud-based system based on the optimization, wherein the measurement data is provided over a statistics channel, and the receiving configuration data is provided over a configuration channel different from the statistics channel. The processor can be further configured cause Wi-Fi client devices to move to other access points prior to the switching off.

In a further exemplary embodiment, a cloud-based system configured to obtain data from a Wi-Fi system for optimization includes a network interface communicatively coupled to the Wi-Fi system including a plurality of access points communicatively coupled to one another and at least one access point communicatively coupled to a gateway providing external communication to the cloud-based system; one or more processors communicatively coupled to the network interface; and memory storing instructions that, when executed, cause the one or more processors to receive periodically or based on command from the cloud-based system one or more of i) on-channel scanning data while an access point is operating on a home channel and ii) off-channel scanning data for one or more off-channels where the access point switches off the home channel; and analyze measurement data based on the on-channel scanning data and the off-channel scanning data for use in the optimization of the Wi-Fi system, wherein the measurement data includes one or more of raw data and processed data, and wherein the measurement data is analyzed from the plurality of access points.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to data gathering systems and methods to enable the optimization of distributed Wi-Fi networks. It is an objective of the systems and methods to provide a Wi-Fi network with superior performance relative to Wi-Fi networks with a single AP, with repeaters, or with multiple mesh nodes. The systems and methods include a distributed Wi-Fi system with a plurality of access points (nodes) which are self-optimizing based on cloud-based control. This self-optimization adapts the topology and configuration of the plurality of access points in real-time based on the operating environment. The plurality of access points communicate with one another via backhaul links and to Wi-Fi client devices via client links, and the each of the backhaul links and each of the client links may use different channels based on the optimization, thereby avoiding the aforementioned limitations in Wi-Fi mesh or repeater systems. In an exemplary aspect, the distributed Wi-Fi system includes a relatively large number of access points (relative to conventional deployments including Wi-Fi mesh or repeater systems). For example, the large number of access points can be 6 to 12 or more in a typical residence. With a large number of access points, the distance between any two access points is small, on a similar scale as the distance between an access point and Wi-Fi client device. Accordingly, signal strength is maintained avoiding coverage issues, and with the optimization of the topology and configuration, congestion and interference are minimized. Thus, the distributed Wi-Fi system addresses all three of the aforementioned limitations in conventional Wi-Fi systems.

Distributed Wi-Fi System

Figure 1:
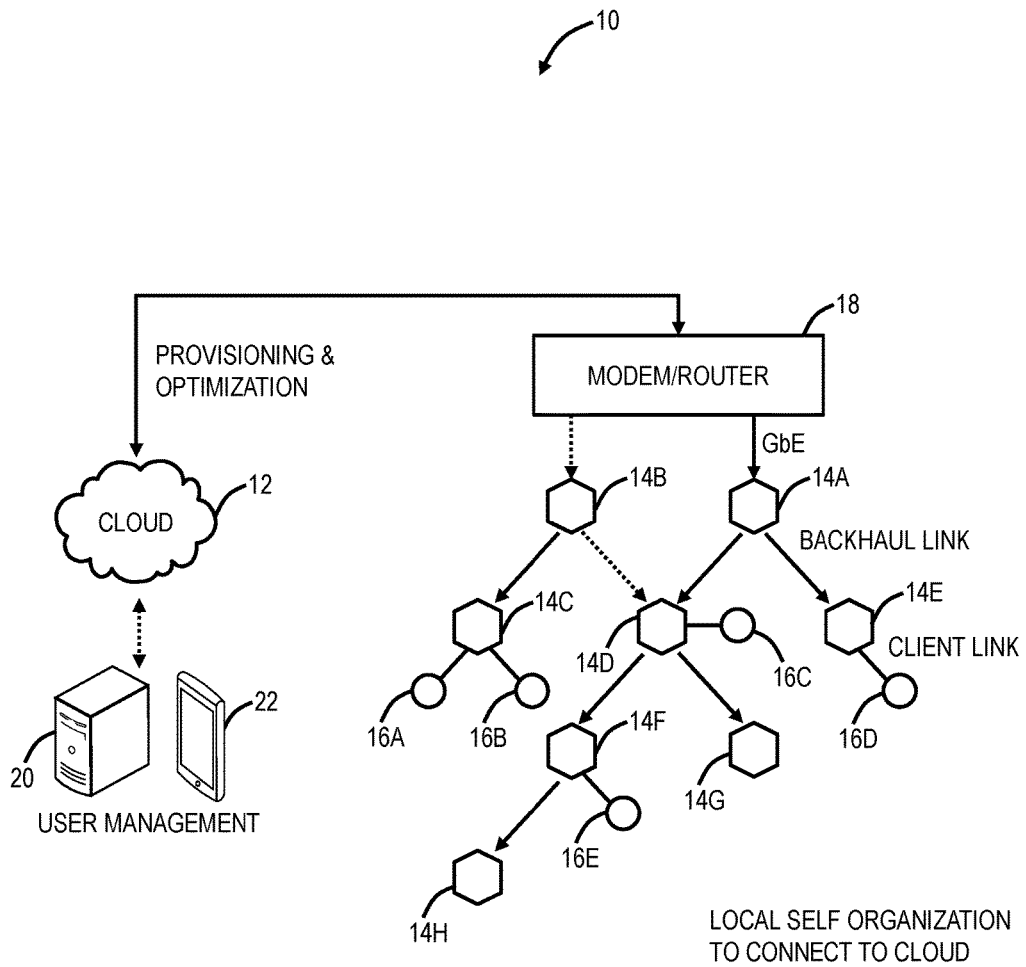
FIG. 1 is a network diagram of a distributed Wi-Fi system with cloud-based control.

Referring to FIG. 1, in an exemplary embodiment, a network diagram illustrates a distributed Wi-Fi system 10 with cloud-based 12 control. The distributed Wi-Fi system 10 can operate in accordance with the IEEE 802.11 protocols and variations thereof. The distributed Wi-Fi system 10 includes a plurality of access points 14 (labeled as access points 14A-14H) which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, or any network-enabled device. For external network connectivity, one or more of the access points 14 can be connected to a modem/router 18 which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the distributed Wi-Fi system 10, therefore, becomes what is commonly known as a "cloud service." The servers 20 are configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an exemplary aspect, the distributed Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation which relies on local configuration such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an exemplary gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
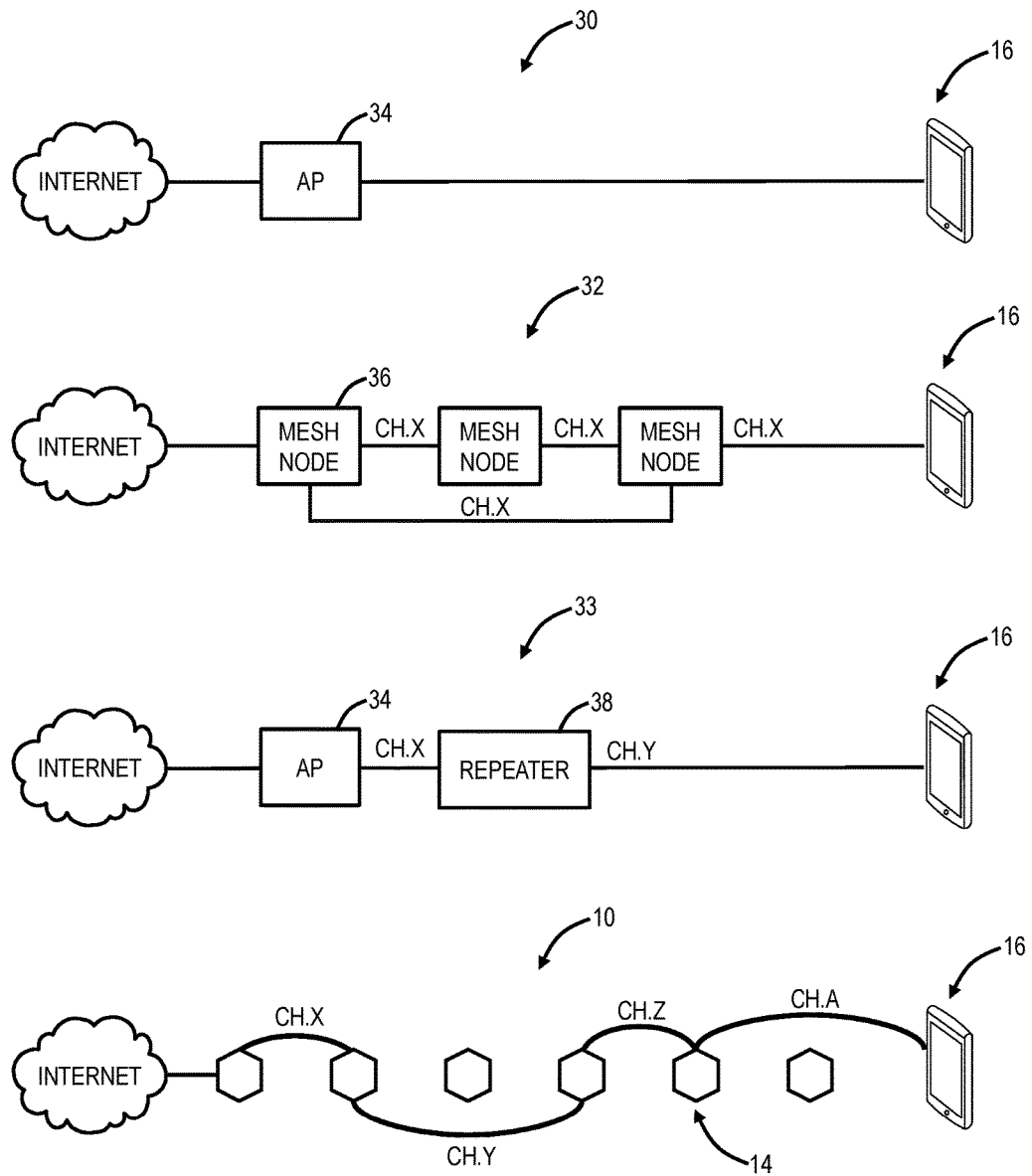
FIG. 2 is a network diagram of differences in operation of the distributed Wi-Fi system of FIG. 1 relative to a conventional single access point system, a Wi-Fi mesh network, and a Wi-Fi repeater system.

Referring to FIG. 2, in an exemplary embodiment, a network diagram illustrates differences in operation of the distributed Wi-Fi system 10 relative to a conventional single access point system 30, a Wi-Fi mesh network 32, and a Wi-Fi repeater network 33. The single access point system 30 relies on a single, high-powered access point 34 which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36 which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Chs. X, Y, Z, A), and, also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33 which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far-either for backhaul or client connectivity. Accordingly, the Wi-Fi signals remain strong and avoid interference by communicating on the same channel as in the Wi-Fi mesh network 32 or with Wi-Fi repeaters. In an exemplary aspect, the servers 20 in the cloud 12 are configured to optimize channel selection for the best user experience.

Configuration and Optimization Process for the Distributed Wi-Fi System

Figure 3:
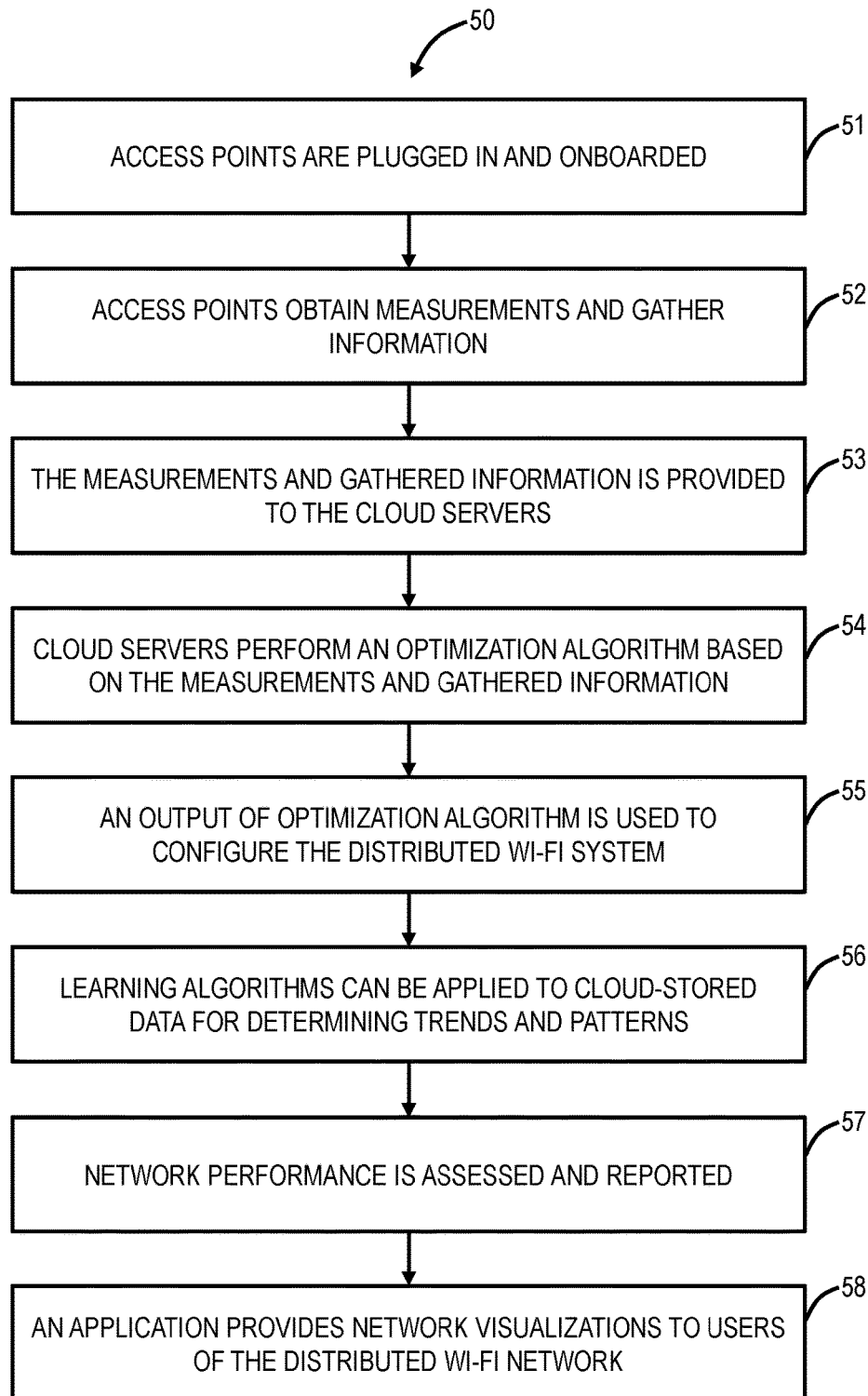
FIG. 3 is a flowchart of a configuration and optimization process for the distributed Wi-Fi system of FIG. 1.
Figure 4:
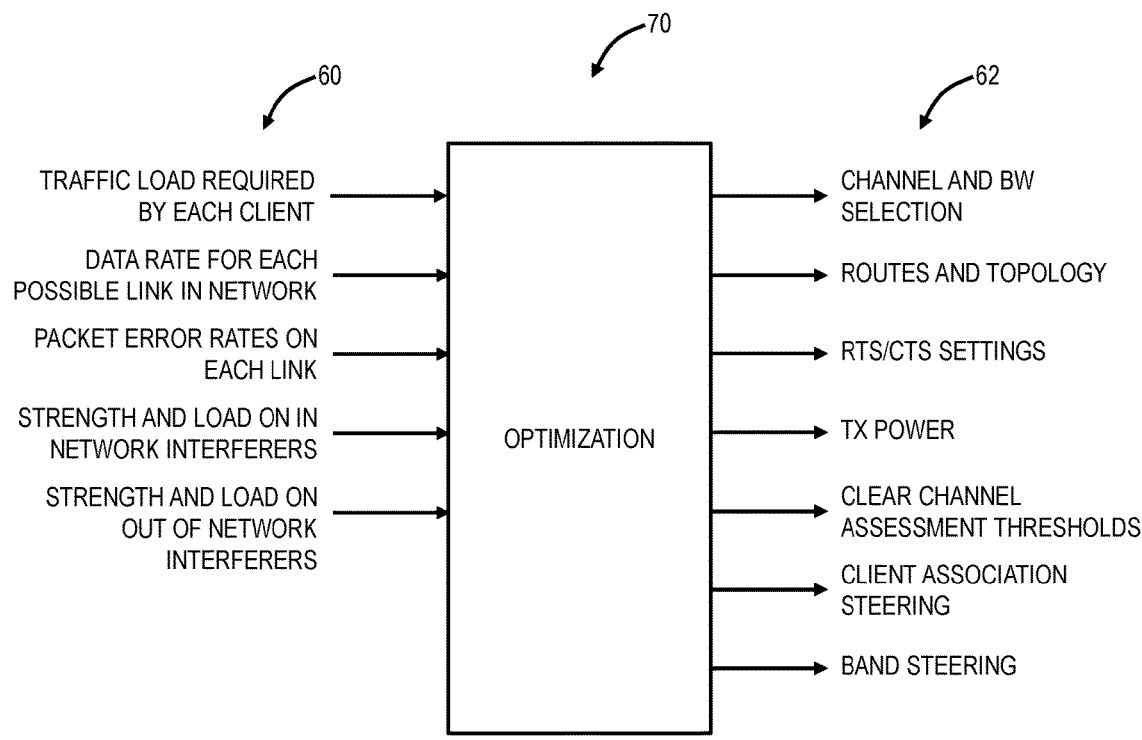
FIG. 4 is a block diagram of inputs and outputs to an optimization as part of the configuration and optimization process of FIG. 3.

Referring to FIG. 3, in an exemplary embodiment, a flowchart illustrates a configuration and optimization process 50 for the distributed Wi-Fi system 10. Specifically, the configuration and optimization process 50 includes various steps 51-58 to enable efficient operation of the distributed Wi-Fi system 10. These steps 51-58 may be performed in a different order and may be repeated on an ongoing basis, allowing the distributed Wi-Fi system 10 to adapt to changing conditions. First, each of the access points 14 are plugged in and onboarded (step 51). In the distributed Wi-Fi system 10, only a subset of the access points 14 are wired to the modem/router 18 (or optionally with a wireless connection to the modem/router 18), and those access points 14 without wired connectivity have to be onboarded to connect to the cloud 12. The onboarding step 51 ensures a newly installed access point 14 connects to the distributed Wi-Fi system 10 so that the access point can receive commands and provide data to the servers 20. The onboarding step 51 can include configuring the access point with the correct Service Set Identifier (SSID) (network ID) and associated security keys. In an exemplary embodiment, the onboarding step 51 is performed with Bluetooth or equivalent connectivity between the access point 14 and a user device 22 allowing a user to provide the SSID, security keys, etc. Once onboarded, the access point 14 can initiate communication over the distributed Wi-Fi system 10 to the servers 20 for configuration.

Second, the access points 14 obtain measurements and gather information to enable optimization of the networking settings (step 52). The information gathered can include signal strengths and supportable data rates between all nodes as well as between all nodes and all Wi-Fi client devices 16. Specifically, the measurement step 52 is performed by each access point 14 to gather data. Various additional measurements can be performed such as measuring an amount of interference, loads (throughputs) required by different applications operating over the distributed Wi-Fi system 10, etc. Third, the measurements and gathered information from the measurement step 52 is provided to the servers 20 in the cloud 12 (step 53). The steps 51-53 are performed on location at the distributed Wi-Fi system 10.

These measurements in steps 52, 53 could include traffic load required by each client, the data rate that can be maintained between each of the nodes and from each of the nodes to each of the clients, the packet error rates in the links between the nodes and between the nodes and the clients, and the like. In addition, the nodes make measurements of the interference levels affecting the network. This includes interference from other cloud controlled distributed Wi-Fi systems ("in-network interferers"), and interference coming from devices that are not part of the controllable network ("out-of-network interferers). It is important to make a distinction between these types of interferers. In-network interferers can be controlled by the cloud system, and therefore can be included in a large optimization over all in-network systems. Out of network interferers cannot be controlled from the cloud, and therefore their interference cannot be moved to another channel or otherwise changed. The system must adapt to them, rather than changing them. These out-of-network interferers include Wi-Fi networks that are not cloud controlled and non-Wi-Fi devices that transmit in the frequencies used by Wi-Fi such as Bluetooth devices, baby monitors, cordless phones, etc.

Another important input is the delay of packets traversing the network. These delays could be derived from direct measurements, time stamping packets as they arrive into the Wi-Fi network at the gateway, and measuring the elapsed time as they depart at the final node. However, such measurement would require some degree of time synchronization between the nodes. Another approach would be to measure the statistics of delay going through each node individually. The average total delay through the network and the distribution of the delays given some assumptions could then be calculated based on the delay statistics through each node individually. Delay can then become a parameter to be minimized in the optimization. It is also useful for the optimization to know the time that each node spends transmitting and receiving. Together with the amount of information transmitted or received, this can be used to determine the average data rate the various links are sustaining.

Fourth, the servers 20 in the cloud 12 use the measurements to perform an optimization algorithm for the distributed Wi-Fi system 10 (step 54). The optimization algorithm outputs the best parameters for the network operation. These include the selection of the channels on which each node should operate for the client links and the backhaul links, the bandwidth on each of these channels that the node should use, the topology of connection between the nodes and the routes for packets through that topology from any source to any destination in the network, the appropriate node for each client to attach to, the band on which each client should attach, etc.

Specifically, the optimization uses the measurements from the nodes as inputs to an objective function which is maximized. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Fifth, an output of the optimization is used to configure the distributed Wi-Fi system 10 (step 55). The nodes and client devices need to be configured from the cloud based on the output of the optimization. Specific techniques are used to make the configuration fast, and to minimize the disruption to a network that is already operating. The outputs of the optimization are the operational parameters for the distributed Wi-Fi system 10. This includes the frequency channels on which each of the nodes is operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the distributed Wi-Fi system 10. The optimization tries to use the lowest possible channel bandwidth for each link that will support the load required by the various user's applications. By using the narrowest sufficient throughput channels, the maximum number of non-interfering channels are left over for other links within the distributed Wi-Fi system 10.

The optimization generates the outputs from the inputs as described above by maximizing an objective function. There are many different possible objective functions. One objective could be to maximize the total throughput provided to all the clients. This goal has the disadvantage that the maximum total throughput might be achieved by starving some clients completely, in order to improve the performance of clients that are already doing well. Another objective could be to enhance as much as possible the performance of the client in the network in the worst situation (maximize the minimum throughput to a client). This goal helps promote fairness but might trade a very large amount of total capacity for an incremental improvement at the worst client. A preferred approach considers the load desired by each client in a network, and maximizing the excess capacity for that load ratio. The optimization can improve the capacity, as well as shift the capacity between the two APs. The desired optimization is the one that maximizes the excess capacity in the direction of the ratio of the loads. This represents giving the distributed Wi-Fi system 10 the most margin to carry the desired loads, making their performance more robust, lower latency, and lower jitter. This strict optimization can be further enhanced by providing a softer optimization function that weighs assigning capacities with a varying scale. A high utility value would be placed on getting the throughput to be higher than the required load. Providing throughput to a client or node above the required load would still be considered a benefit, but would be weighted much less heavily than getting all the clients/nodes to the load they are requiring. Such a soft weighted optimization function allows for a more beneficial tradeoff of excess performance between devices.

Another set of optimization outputs defines the topology of the distributed Wi-Fi system 10, meaning which nodes connect to which other nodes. The actual route through the distributed Wi-Fi system 10 between two clients or the client and the Internet gateway (modem/router 18) is also an output of the optimization. Again, the optimization attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the system.

Sixth, learning algorithms can be applied to cloud-stored data for determining trends and patterns (step 56). Note, the servers 20 can store the measurements from the nodes, results from the optimizations, and subsequent measurements after associated optimizations. With this data, trends and patterns can be determined and analyzed for various purposes. Because reconfiguring a network takes time and is always at least partially disruptive to active communication, it is beneficial to configure the network for peak load, before that peak load arrives. By learning from the historical data that has already been captured, it is possible to predict the usage and interference that will occur at a future time. Other uses of learning on the captured data include identifying bugs and discovering bugs in the behavior of client devices. Once bugs in the behavior of client devices are discovered, it may be possible to work around those bugs using tools and commands from the infrastructure side of the network.

Seventh, the performance of the network can be assessed and reported to the user or to a service provider whose services are running over Wi-Fi (step 57). Eighth, an application (such as a mobile app operating on the user device 22) can provide a user visibility into the network operation (step 58). This would include the display of network activity and performance metrics. The mobile app can be used to convey information to the user, make measurements, and allow the user to control certain aspects of Wi-Fi the network operation. The mobile app also communicates to the internet over the cellular system to assist in onboarding the nodes when they are first being set up. The mobile phone app, utilizing the cellular system, also provides a way for the Wi-Fi network to communicate with the internet and cloud when the user's normal internet connection is not functioning. This cellular based connection can be used to signal status, notify the service provider and other users, and can even be used to carry data from the home to the internet during the time that the user's normal internet connection is malfunctioning.

The configuration and optimization process 50 is described herein with reference to the distributed Wi-Fi system 10 as an exemplary embodiment. Those skilled in the art will recognize the configuration and optimization process 50 can operate with any type of multiple node Wi-Fi system (i.e., a distributed Wi-Fi network or Wi-Fi system) including the Wi-Fi mesh network 32, the Wi-Fi repeater network 33, etc. For example, cloud-based control can also be implemented in the Wi-Fi mesh network 32, the Wi-Fi repeater network 33, etc. and the various systems and methods described herein can operate as well here for cloud-based control and optimization. Also, the terminology "distributed Wi-Fi network" or "Wi-Fi system" can also apply to the Wi-Fi mesh network 32, the Wi-Fi repeater network 33, etc. whereas the distributed Wi-Fi system 10 is a specific embodiment of a distributed Wi-Fi network. That is the distributed Wi-Fi system 10 is similar to the Wi-Fi mesh network 32, the Wi-Fi repeater network 33, etc. in that it does support multiple nodes, but it does have the aforementioned distinctions to overcome limitations associated with each.

Optimization

Referring to FIG. 3, in an exemplary embodiment, a block diagram illustrates inputs 60 and outputs 62 to an optimization 70. The inputs 60 can include, for example, traffic load required by each client, signal strengths between nodes and between access points 14 (nodes) and Wi-fi client devices 16, data rate for each possible link in the network, packet error rates on each link, strength and load on in-network interferers, and strength and load on out-of-network interferers. Again, these inputs are based on measurements and data gathered by the plurality of access points 14 and communicated to the servers 20 in the cloud 12. The servers 20 are configured to implement the optimization 70. The outputs of the optimization 70 include, for example, channel and bandwidth (BW) selection, routes and topology, Request to Send/Clear to Send (RTS/CTS) settings, Transmitter (TX) power, clear channel assessment thresholds, client association steering, and band steering.

Access Point

Figure 5:
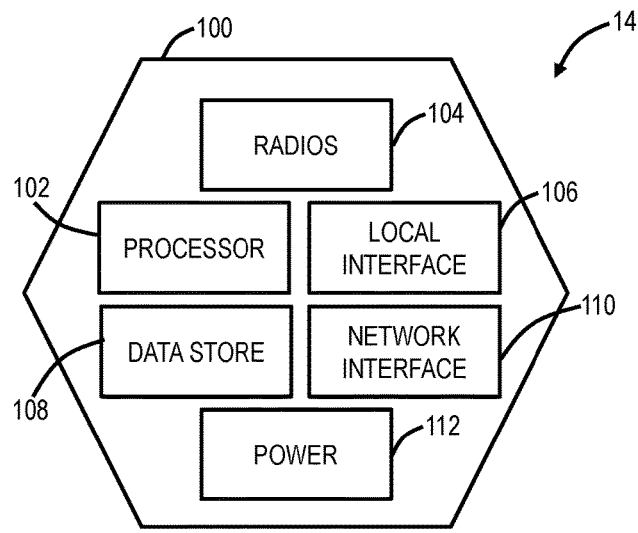
FIG. 5 is a block diagram of functional components of the access point in the distributed Wi-Fi system of FIG. 1.

Referring to FIG. 5, in an exemplary embodiment, a block diagram illustrates functional components of the access point 14 in the distributed Wi-Fi system 10. The access point 14 includes a physical form factor 100 which contains a processor 102, a plurality of radios 104, a local interface 106, a data store 108, a network interface 110, and power 112. It should be appreciated by those of ordinary skill in the art that FIG. 5 depicts the access point 14 in an oversimplified manner, and a practical embodiment may include additional components and suitably configured processing logic to support features described herein or known or conventional operating features that are not described in detail herein.

In an exemplary embodiment, the form factor 100 is a compact physical implementation where the access point 14 directly plugs into an electrical socket and is physically supported by the electrical plug connection to the electrical socket. This compact physical implementation is ideal for a large number of access points 14 distributed throughout a residence. The processor 102 is a hardware device for executing software instructions. The processor 102 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an exemplary embodiment, the processor 102 may include a mobile-optimized processor such as optimized for power consumption and mobile applications.

The radios 104 enable wireless communication in the distributed Wi-Fi system 10. The radios 104 can operate according to the IEEE 802.11 standard. The radios 104 include address, control, and/or data connections to enable appropriate communications on the distributed Wi-Fi system 10. As described herein, the access point 14 includes a plurality of radios to support different links, i.e., backhaul links and client links. The optimization 70 determines the configuration of the radios 104 such as bandwidth, channels, topology, etc. In an exemplary embodiment, the access points 14 support dual band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an exemplary embodiment, the access points 14 can also include the local interface 106 allowing connectivity to the user device 22 (or a Wi-Fi client device 16) for onboarding to the distributed Wi-Fi system 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device which does not support Wi-Fi. In an exemplary embodiment, all of the access points 14 in the distributed Wi-Fi system 10 include the network interface 110. In another exemplary embodiment, select access points 14 which connect to the modem/router 18 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 6:
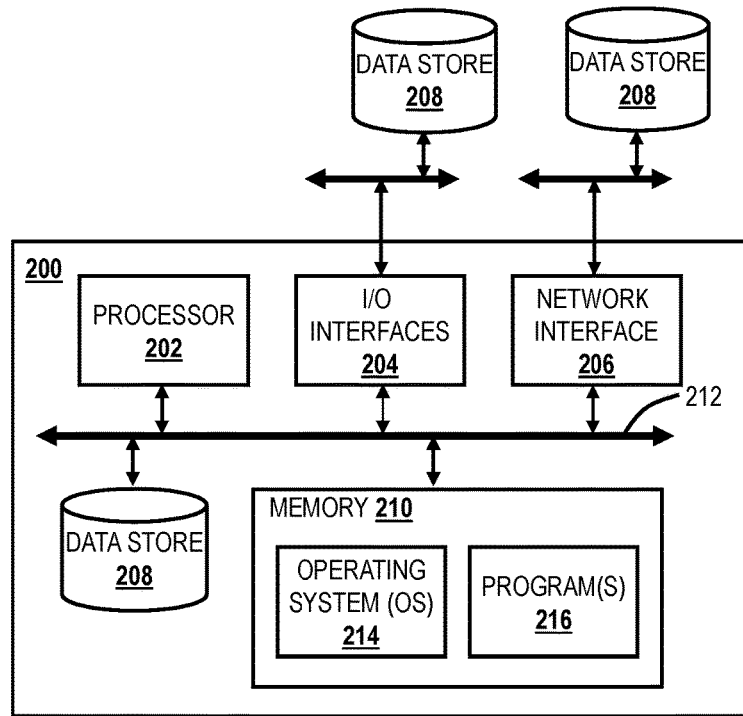
FIG. 6 is a block diagram of functional components of a server, a Wi-Fi client device, or a user device which may be used with the distributed Wi-Fi system of FIG. 1.

Referring to FIG. 6, in an exemplary embodiment, a block diagram illustrates functional components of the server 20, the Wi-Fi client device 16, or the user device 22 which may be used with the distributed Wi-Fi system 10. FIG. 6 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization 70.

Data Gathering

Again, in various exemplary embodiments, the systems and methods provide techniques for gathering data and measurements in the distributed Wi-Fi system 10 in the configuration and optimization process 50 for use in the optimization 70. As described herein, the measurements and gathered data from the access points 14 can be referred to as measurements or data collectively. This data can include, without limitation, traffic from/to different clients, signal strengths and data rates used from/to different clients, Wi-Fi channel conditions, performance experienced by different traffic flows, congestion levels on the access points 14, etc. This data is reported to the cloud 12 to the servers 20 both periodically and in an event-driven fashion. The event-driven reporting can be based on crossing an absolute or relative threshold. Further, the reporting frequency can be dynamically adjusted based on thresholds or levels of the parameters being measured. The access points 14 can report the data as raw data, or when the volume of data is large, it can be compressed and reported through statistical measures such as the mean, median, distribution, etc. An objective of the data gathering is to perform the gathering and reporting while minimizing the impact on the performance of active traffic flows that are being carried by the access points 14.

Figure 7:
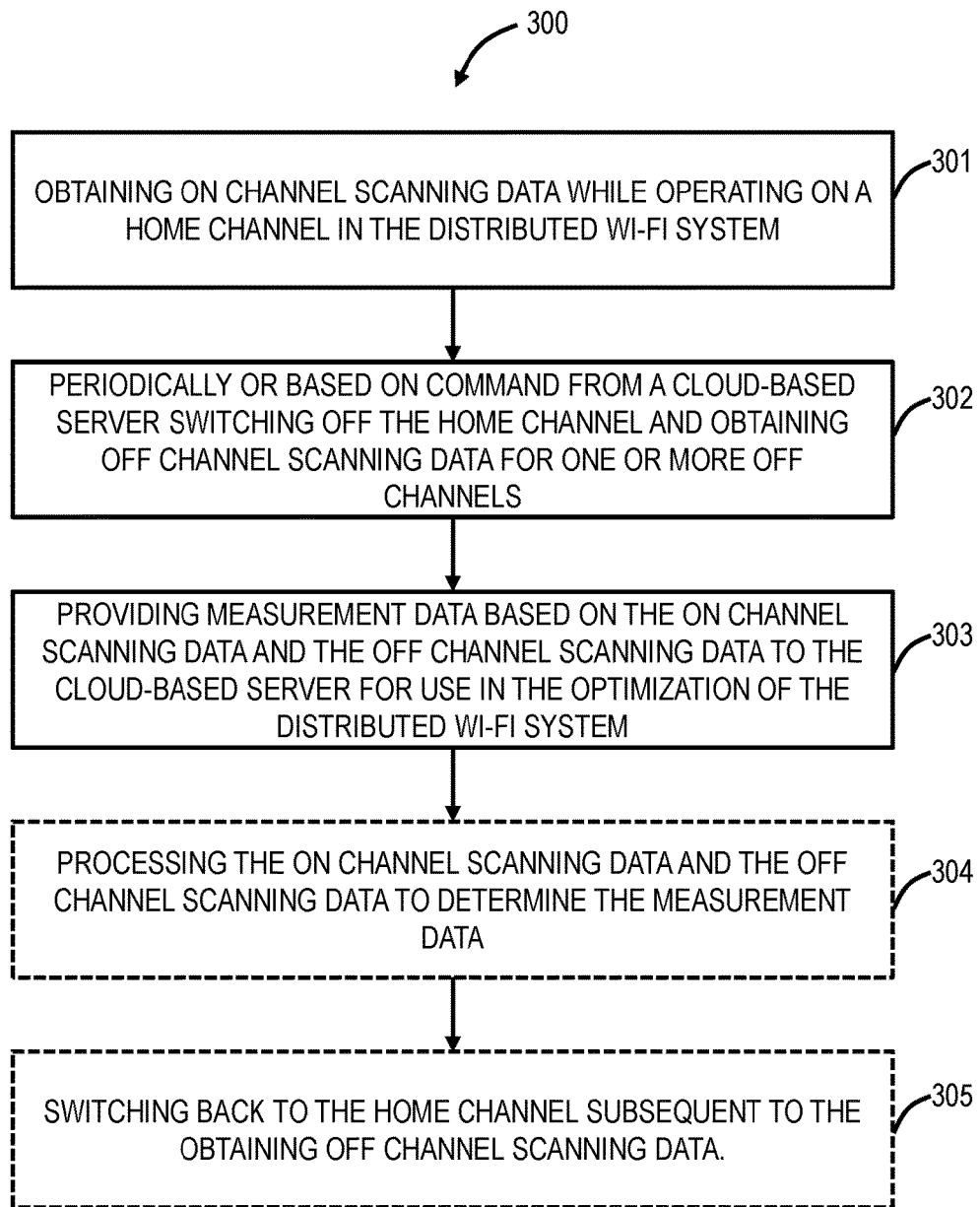
FIG. 7 is a flowchart of a data gathering process by an access point in the distributed Wi-Fi system of FIG. 1.

Referring to FIG. 7, in an exemplary embodiment, a flowchart illustrates a data gathering process 300 by an access point 14 in the distributed Wi-Fi system 10. The data gathering process 300 includes obtaining on-channel scanning data while operating on a home channel in the distributed Wi-Fi system 10 (step 301); periodically or based on command from a cloud-based system switching off the home channel and obtaining off-channel scanning data for one or more off-channels (step 302); and providing measurement data based on the on-channel scanning data and the off-channel scanning to the cloud-based system for use in the optimization of the distributed Wi-Fi system 10 (step 303). As described herein, the home channel is a channel the associated radio 104 is presently operating on based on a current configuration (such as based on a previous optimization 70 or an initial configuration). The home channel can also be for client links or backhaul links. That is, the access point 14 can be operating on a home channel for communication with the clients 16 on a client link as well as on another home channel for communication with other access points 14 in the distributed Wi-Fi system 10, i.e., backhaul links. The cloud-based system can be the servers 20 in the cloud 12.

The data gathering process 300 can further include processing the on-channel scanning data and the off-channel scanning data to determine the measurement data (step 304). This processing is performed locally to the access point 14 to determine measurements which are then transmitted to the server 20. In another exemplary embodiment, the access point 14 can merely transmit the on-channel scanning data and the off-channel scanning data as raw data without processing. However, the processing reduces bandwidth requirements over the distributed Wi-Fi system 10 for the data gathering process 300. Also, the processing can simply include compressing the on-channel scanning data and the off-channel scanning data prior to transmission to the server 20. The processing can include determining a division of time that the home channel is divided based on a combination of direct measurements and computations based on the direct measurements. The processing can include determining delays of packets over the distributed Wi-Fi system through one of direct measurements and statistics of delay at the access point. Finally, the data gathering process 300 can further include switching back to the home channel subsequent to the obtaining off-channel scanning data (step 305).

For illustration purposes, the data gathering process 300 is described with reference to the distributed Wi-Fi system 10. Those skilled in the art will recognize the data gathering process 300 can also operate with other type of Wi-Fi systems such as the Wi-Fi mesh network 32, the Wi-Fi repeater network 33, etc. That is, the data gathering process 300 generally contemplates operation with any multiple access point 14, 34 system and can be implemented by the mesh nodes 36, the access point 34, the repeater 38, etc. Again, the data gathering process 300 is advantageous for cloud-controlled Wi-Fi systems to able intelligent, remote control and optimization.

In an exemplary embodiment, the scanning for either on-channel scanning data or off-channel scanning data can be performed and reported at different channel bandwidths (e.g., 20, 40, 80. 160 MHz). For example, the on-channel scanning can be performed at a different channel bandwidth than what is currently configured on the home channel. Further, the off-channel scanning can be set at any of the different channel bandwidths. For example, the periodic scanning can rotate between the different channel bandwidths to provide the cloud-based system more representative details on how the Wi-Fi system is operating.

The measurement data can include a plurality of Received Signal Strength Indicators (RSSI), achievable data rates, capacity, load, error rates, delays, and fractions of time spent transmitting and receiving. The switching off can be determined based on a load of the access point 14. For example, the process 300 can include monitoring a status of queues in the access point 14 to determine when the load is low for determining the switching off. The process 300 can further include notifying other access points in the distributed Wi-Fi system 10 of the switching off via one of a broadcast frame and an information element in the beacon, with an offset from a Timing Synchronization Function (TSF) timer. Optionally, the access point 14 is lightly loaded compared to at least one additional access point 14 in the distributed Wi-Fi system 10, and wherein the access point 14 is configured to perform the obtaining off-channel scanning data for the at least one additional access point 14. The access point 14 for the off-channel scanning data can send probe requests for a particular Service Set Identifier (SSID) to measure signal strengths to a particular neighbor to reduce the number of probe responses received. The access point 14 for the off-channel scanning data can send frames that spoof another in-network Basic Service Set (BSS) to elicit responses from neighboring access points and clients. The process 300 can further include receiving configuration data from the cloud-based system based on the optimization, wherein the providing measurement data is performed over a statistics channel, and the receiving configuration data is performed over a configuration channel different from the statistics channel.

In another exemplary embodiment, an access point 14 in the distributed Wi-Fi system 10 includes a plurality of radios communicating on the distributed Wi-Fi system; and a processor communicatively coupled to the plurality of radios and configured to cause one or more radios of the plurality of radios to obtain on-channel scanning data while operating on a home channel in the distributed Wi-Fi system; periodically or based on command from a cloud-based system cause the one or more radios to switch off the home channel and obtain off-channel scanning data for one or more off-channels; and providing measurement data based on the on-channel scanning data and the off-channel scanning data to the cloud-based system for use in the optimization of the distributed Wi-Fi system 10.

In a further exemplary embodiment, the distributed Wi-Fi system 10 includes a plurality of access points 14 communicatively coupled to one another and at least one access point communicatively coupled to a gateway providing external communication for the distributed Wi-Fi system 10 and communication to a cloud-based system; wherein each of the plurality of access points 14 are configured to obtain on-channel scanning data while operating on a home channel in the distributed Wi-Fi system; periodically or based on command from a cloud-based system switch off the home channel and obtain off-channel scanning data for one or more off-channels; and provide measurement data based on the on-channel scanning data and the off-channel scanning data to the cloud-based system for use in the optimization of the distributed Wi-Fi system 10.

In yet another exemplary embodiment, a method of gathering data by the access point 14, 34 or mesh node 36 or repeater 38 in a Wi-Fi system includes periodically or based on command from a cloud-based system performing one or more of i) obtaining on-channel scanning data while operating on a home channel and ii) switching off the home channel and obtaining off-channel scanning data for one or more off-channels; and providing measurement data based on one or more of the on-channel scanning data and the off-channel scanning data to the cloud-based system for use in the optimization of the Wi-Fi system, wherein the measurement data comprises one or more of raw data and processed data.

In yet another exemplary embodiment, an access point 14, 34, mesh node 36 or repeater 38 configured to gather data for optimization includes a plurality of radios communicating on the Wi-Fi system; and a processor communicatively coupled to the plurality of radios and configured to: periodically or based on command from a cloud-based system cause the one or more radios to one or more of i) obtain on-channel scanning data while operating on a home channel and ii) switch off the home channel and obtain off-channel scanning data for one or more off-channels; and provide measurement data based on the on-channel scanning data and the off-channel scanning data to the cloud-based system for use in the optimization of the distributed Wi-Fi system, wherein the measurement data comprises one or more of raw data and processed data.

In yet another exemplary embodiment, a Wi-Fi system configured to gather data for optimization includes a plurality of access points communicatively coupled to one another and at least one access point communicatively coupled to a gateway providing external communication for the Wi-Fi system and communication to a cloud-based system; wherein each of the plurality of access points are configured to: periodically or based on command from a cloud-based system perform one or more of i) obtain on-channel scanning data while operating on a home channel and ii) switch off the home channel and obtain off-channel scanning data for one or more off-channels; and provide measurement data based on the on-channel scanning data and the off-channel scanning data to the cloud-based system for use in the optimization of the Wi-Fi system, wherein the measurement data comprises one or more of raw data and processed data.

The access points 14 can periodically or upon receiving a command from the cloud 12 perform off-channel scans with the radio(s) 104 by briefly switching and monitoring a channel other than its home channel and at different channel widths (e. g. 20, 40, 80, and 160 MHz). During the scanning period, the access point 14 can collect information on the busyness of the channel both due to Wi-Fi and non-Wi-Fi transmissions and identify the occupancy levels due to each of the neighboring Basic Service Sets (BSSs). The access point 14 can also measure the signal strengths from neighboring access points 14 and non-associated clients 16 by receiving management frames such as beacons as well as data frames. In order to increase the efficiency of data collection from in-network access points 14 (ones that are part of the distributed Wi-Fi system 10) and clients 16, the access point 14 performing the scan can send frames that spoof another in-network BSS to elicit responses from neighboring access points 14 and clients 16. Alternatively, the neighboring in-network access points 14 can be instructed to transmit to their associated clients 16 eliciting responses that can, in turn, be measured by the scanning access point 14. The access points 14 can also measure the Modulation and Coding Scheme (MCSs) being used between neighboring access points 14 and their clients 16.

To optimize the distributed Wi-Fi system 10, it is beneficial to know the signal strengths from all clients 16 to all access points 14, each of which is a potential place for the clients 16 to associate with. However, some access points 14 have trouble receiving and recording the signal strength of clients 16 that are not associated with them. One way to circumvent this problem is to put the access point 14 doing the scan (whether off-channel or on-channel), into a multiple BSSID mode, and add the neighboring access points 14 BSSIDs to the access point list. Next the access point 14 should be configured not to send acknowledgments. This pair of actions will allow the access point 14 to silently listen to all the client transmissions, even transmissions from clients 16 that are not associated with that access point 14. In an exemplary embodiment, a transmission can be triggered from a Wi-Fi client device 16 from which measurement is desired by the measuring access point 14 transmitting a packet to it from the access point 14 that the Wi-Fi client device 16 is already connected to, i.e., coordination between access points 14 to trigger the Wi-Fi client device 16 to transmit which a different access point 14 is listening to that Wi-Fi client device 16.

While performing off-channel scans, the access point 14 is unable to transmit and receive on its home channel which could potentially disrupt the performance of traffic flows. To mitigate disruption, the access point 14 could perform scans only when they are idle or lightly loaded. Again, this can be based on monitoring a queue associated with the access point 14. Indeed, the multiple access points 14 in a home could be leveraged to infer the interference at heavily loaded nodes from proximate idle or lightly loaded access points 14 whose measurements are highly correlated. In that case, the heavily loaded access point 14 would never need to go off-channel to scan, as surrounding lightly loaded access points 14 would do the off-channel scanning for it. Further, access points 14 could decide to skip or postpone scans based on estimating the probability of packet loss using information on the free memory available to buffer data that arrives during the scanning period. The access points 14 can also notify other in-network access points 14 of their planned absence using a broadcast frame or an information element in the beacon, with an offset from a Timing Synchronization Function (TSF) timer. This ensures that other in-network access points 14 will not attempt to transmit to the access point 14 when it is not on its home channel. Associated client devices 16 could even be forced to connect to a different access point 14 in the vicinity for the duration of the off-channel scan and transitioned back to the original access point 14 after the scan is complete. In order to reduce the amount of time the access point 14 is away from its home channel, it could scan channels sequentially, returning to its home channel between scans. The access points 14 could also perform directed scans by sending probe requests for a particular SSID to measure signal strengths to a particular neighbor. This reduces the amount of time the access point needs to spend off channel, but triggering a response quickly from the neighbor the access point is trying to learn about. In addition, sending probe requests to a particular SSID reduces number of probe responses received, thus reducing the overhead of transmissions and therefore interference on the channel generated by gathering the data. Further, the access point 14, prior to switching off-channel, can move any associated clients 16 to other access points 14. Also, this could be done by the cloud-based system. With no associated clients 16, the access point 14 can perform off-channel scanning without network disruption.

While an access point 14 is on the home channel transmitting and receiving to associated clients 16 (or on the backhaul link transmitting and receiving to other access points 14), it measures the traffic transmitted to and received from each client 16 as well as the MCS rates used, the number of Media Access Control (MAC) Protocol Data Unit (MPDUs) in each aggregate, the packet error rate, the number of missing acknowledgements, etc. While on the home channel, the access point 14 can also listen to transmissions on that same channel that are associated with a different access point 14 operating on that same channel. While on the home channel, operating normally and serving any associated Wi-Fi client devices 16, the access point 16 can also be gathering measurements on all devices operating on that same channel that is within radio range. This includes Wi-Fi client devices 16 as well as other access points 14.

Another important piece of data to gather is the delay of packets traversing the network. These delays could be derived from direct measurements, time stamping packets as they arrive into the distributed Wi-Fi system 10 at the gateway (modem/router 18), and measuring the elapsed time as they depart at the final access point 14. However, such measurement requires some degree of time synchronization between the access points 14. Another approach would be to measure the statistics of delay going through each access point 14 individually. The average total delay through the distributed Wi-Fi system 10, and the distribution of the delays given some assumptions could then be calculated based on the delay statistics through each access point 14 individually. Delay can then become a parameter to be minimized in the optimization 70. These delays should be obtained or derived from the pathway to each client 16 in the distributed Wi-Fi system 10.

The access point 14 measures the occupancy of the transmit queue, measuring the queue length, i.e., the backlog in the transmit queues over time as well as the queue utilization, i.e., the fraction of the time that the queue is non-empty. These measures are well correlated with the performance experienced by the traffic flows carried by the access point 14. The maximum throughput that can be achieved by the access point 14 if the traffic it carried were to be scaled up can be determined as the ratio of the access point's 14 throughput to the queue utilization.

Figure 8:
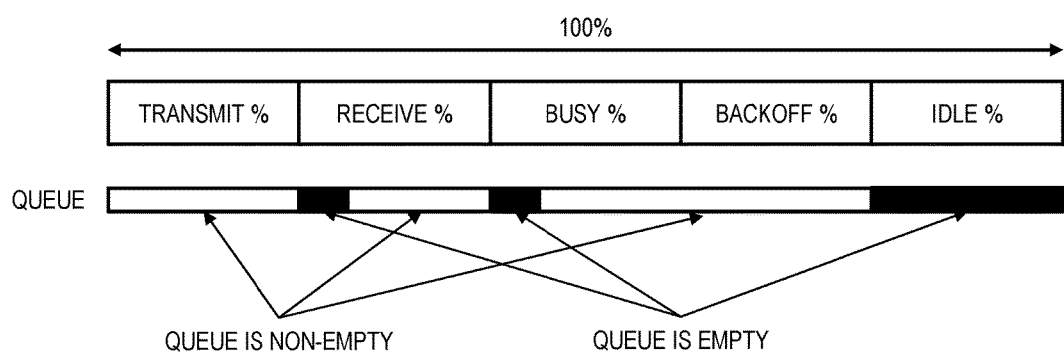
FIG. 8 is a graph of fractions of time-related to a channel, such as the home channel.

Referring to FIG. 8, in an exemplary embodiment, a graph illustrates fractions of time-related to a channel, such as the home channel. On its home channel, the access point 14 can also measure/infer the fractions of time that the channel is busy due to the activity of Wi-Fi transmitters in neighboring networks, i.e., interference (Busy %); the access point 14 spends transmitting (Transmit %); the access point 14 spends receiving from associated clients 16 (Receive %); the access point 14 spends counting down its contention window when the channel is idle, and the node has packets in its transmit queue (Backoff %); the channel is idle and the access point 14 has an empty transmit queue (Idle %). FIG. 8 illustrates an example of the channel. Understanding how time is distributed across these categories is very useful. The ratio of the access point's 14 throughput to its transmit time fraction corresponds to the effective data rate the access point 14 achieves when it gains access to the channel. The Idle % corresponds to the time that the access point 14 could hypothetically use to transmit data, and is a reflection of the excess capacity available to the access point 14. However, not all these time fractions may be directly measurable at the access point 14 due to implementation limitations. The transmit %, receive %, and busy % may be directly reported by a driver, but the backoff % and idle % cannot be distinguished. Jointly measuring the queue occupancy and channel time fractions over a period of time allows the different time fractions to be separately estimated by leveraging the relationship between the two, see FIG. 8. For instance, the backoff % can be computed as Queue utilization*(100−Receive %−Busy %)−Transmit %.

It is also useful to distinguish the interference due to the access point 14 within the distributed Wi-Fi system 10 that can be centrally controlled from the interference due to nodes outside the distributed Wi-Fi system 10. Data jointly gathered from access points 14 over a time period can be used to estimate the in-network interference using the transmit and receive activity reported by neighboring nodes as well as the signal strength between nodes. Thus, the out of network interference can be estimated by subtracting out the in-network interference from the total measured interference at the access point 14. An example of such a calculation would be to measure the total busy time at one access point 14 in the home. The other access points 14 in the distributed Wi-Fi system 10 in the home could report the time they spent transmitting. The time that all other access points 14 in the home's distributed Wi-Fi system 10 spend transmitting could be subtracted from the busy time at the access point 14 of interest. This would remove all the traffic associated with other access points 14 that are part of the home's distributed Wi-Fi system 10, leaving only the airtime consumed by transmissions from networks in neighboring homes. For the above process to be successful, the channel time fractions must be measured or estimated over an identical time period for all access points 14. One technique that could be employed is the synchronization of data reporting across all access points 14 in the distributed Wi-Fi system 10 so that all access points 14 report statistics for identical time slices. Another technique that could be employed is to aggregate data over a sufficient period of time from all access points 14 and compute statistical measures of the channel time fractions over this period to use for the estimation. This alleviates the need to synchronize the data gathering across the access points 14.

The cloud-based system, i.e., the server 20, is generally configured to use the measurement data for optimization and control of the distributed Wi-Fi system 10. In an exemplary embodiment, the server 20 can be configured to perform analysis of the measurement data from multiple access points 14 at once to derive other measurement data. For example, this can include subtracting the TX time of an access point 14 with the RX time of another access point 14. Here, the measurement data from multiple access points 14 can be time synchronized allowing alignment in the cloud 12 for comparison, analysis, etc. Alternatively, the measurement data from multiple access points 14 can be only coarsely time synchronized such as through averaging over time periods which are much longer than time synchronization uncertainty, and subtracting or otherwise deriving a result from measurements at different access points 14 by working with the values averaged over time.

In order to reduce the volume of data that is collected from the access points 14, redundant information can be omitted, e.g., data on communication between a pair of access points 14 need only be reported by one of them, say the transmitter. Data can also be compressed by sending statistics such as averages, moving averages, histograms, etc. instead of raw data. When raw data is sent, reports can be batched across a long-time period and reported in a compressed format. The volume of data can be further reduced by reducing the frequency of periodic reports and supplementing them with event driven reporting. The cloud 12 could configure nodes with parameters such as absolute thresholds for different quantities (load, capacity, Received Signal Strength Indicator (RSSI), etc.), and the access points 14 could report data only when the thresholds are crossed. Relative thresholds can also be used with access points 14 sending reports only when the new report differs from the one previously sent by at least the specified margin. Alternatively, the thresholds could be used to specify policies that modulate the frequency at which access points 14 gathers and report data. Some measurements that are intrusive or otherwise cumbersome to calculate (e.g., off-channel scans) could be triggered only when a different parameter crosses a specified threshold. Additionally, some statistics could be measured and reported only when explicitly requested by the cloud 12. In this way, any costs due to overheads imposed by data measurement and reporting can be controlled.

In an exemplary embodiment, the access points 14 can continually take measurements, such as every minute or some other configurable time period, but the reporting to the cloud-based system can be done in batches. For example, obtain measurements over X time periods and report the X sets of measurements at once. This approach reduces the frequency of communication to the cloud 12, while still ensuring the cloud-based system gets all of the necessary measurements for optimization. Further, the access point 14 can be configured to compress the measurement data prior to sending to the cloud 12 to reduce the overall bandwidth required. In another exemplary embodiment, to further reduce reporting bandwidth, there can be coordination between access points 14 on what is reported such as to reduce redundancy. For example, it is only necessary to report TX statistics on a given link and not necessary to give the corresponding RX statistics from the partner node on the link since the TX and RX statistics for a given link will be the same and provide the same information.

Separation of Statistics and Configuration-Channel

Figure 9:
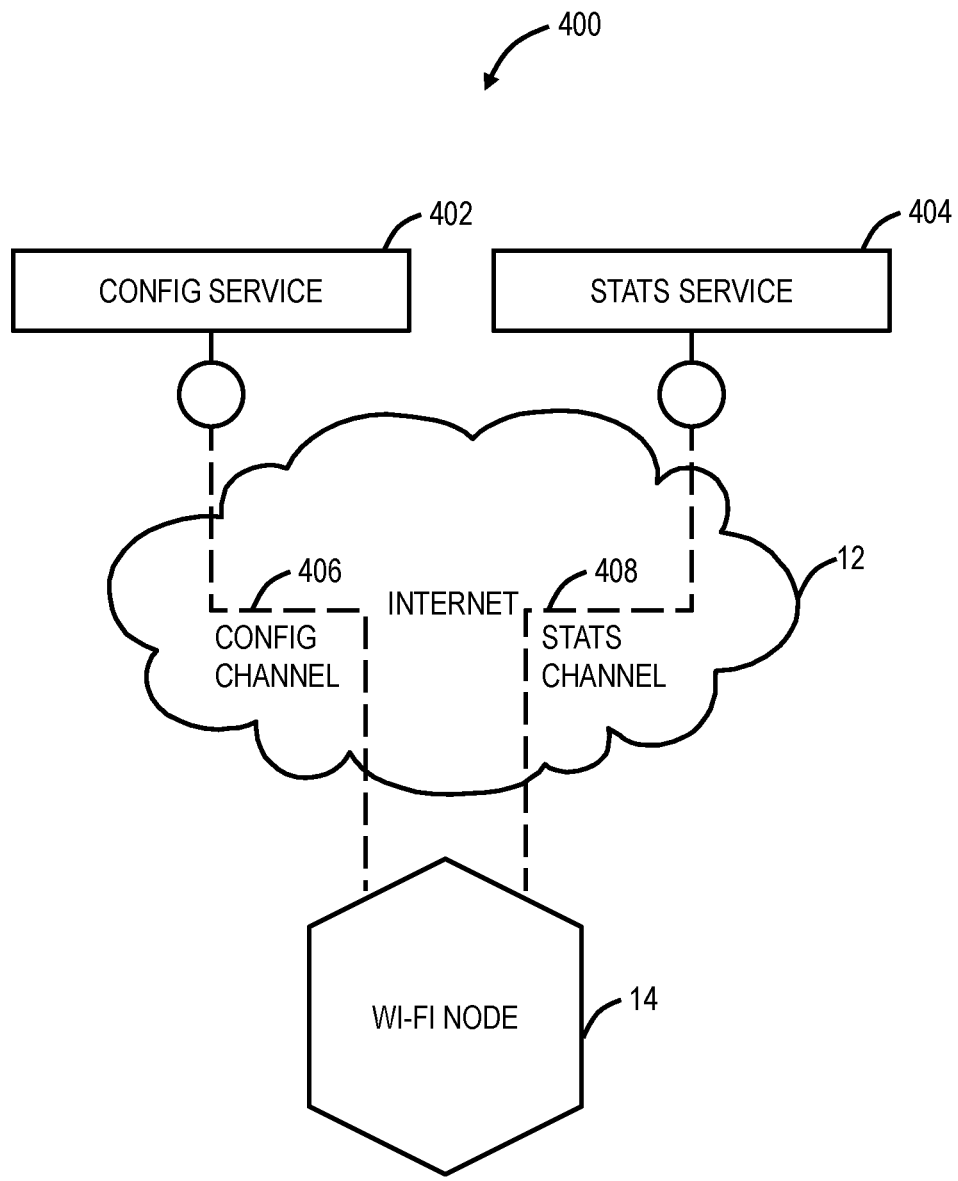
FIG. 9 is a network diagram of a network with an access point in the distributed Wi-Fi system of FIG. 1 communicating with a configuration service and a statistics service in the cloud.

Referring to FIG. 9, in an exemplary embodiment, a network diagram illustrates a network 400 with an access point 14 in the distributed Wi-Fi system 10 communicating with a configuration service 402 and a statistics service 404 in the cloud 12. The data gathered by the access points 14 in the distributed Wi-Fi system 10 as described above needs to be moved into the cloud 12. It is beneficial to do this over a separate channel from the channel used to configure and control the access points 14. This is because managing the access points 14 from the cloud 12 has distinct traffic patterns from collecting data. The configuration of access points 14 is infrequent and must be reliable and transactional, whereas statistics reporting from the access points 14 to the services 402, 404 has large volumes hence must be efficient and can accommodate some loss of data. Hence, the access points 14 can implement different communication channels and approaches for configuration and statistics, namely a configuration channel 406 to the configuration service 402 and a statistics channel 408 to the statistics service 404.

The configuration service 402 and the statistics service 404 are deployed in the cloud 12, such as on the same or different servers 20. The services 402, 404 can be referred to as a cloud-based system which can operate on the servers 20 in the cloud 12. These services 402, 404 can communicate via different protocols as well as be at different locations. Each of the access points 14 in the distributed Wi-Fi system 10 are configured to communicate with both of the services 402, 404, over the configuration channel 406 and the statistics channel 408, respectively. The configuration-channel 406 can use a transaction oriented reliable communication protocol such as Open vSwitch Database Management Protocol (OVSDB) to interact with the configuration service 402. The statistics channel 408 can use an efficient and lightweight communication protocol such as ProtoBuf over Message Queue Telemetry Transport (MQTT) to report statistics (measurement data) to the statistics service 404.

This approach provides several advantages. The configuration of access points 14 is critical activity and does not get impacted due to saturation of traffic or high volume related problems in statistics channel 408. The statistics communication protocol can be selected for high efficiency thereby minimizing management overhead of the access points 14.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for gathering data by an access point in a Wi-Fi system for optimization, the method comprising:
   in the access point, periodically or based on command from a cloud-based system i) obtaining on-channel scanning data while operating on a home channel and ii) switching off the home channel and obtaining off-channel scanning data for one or more off-channels;
   providing measurement data based on one or more of the on-channel scanning data and the off-channel scanning data to the cloud-based system for use in the optimization of the Wi-Fi system, wherein the measurement data comprises raw data and processed data; and
   determining a division of time on the home channel that the access point spends in a plurality of categories based on a combination of direct measurements and computations based on the direct measurements, to determine an effective data rate of the access point for the optimization, wherein the plurality of categories include transmitting, receiving, busy, and idle.

2. The method of claim 1, wherein, when the measurement data is the processed data, the method further comprises determining delays of packets over the Wi-Fi system through one of direct measurements and statistics of delay at the access point.

3. The method of claim 1, wherein the measurement data comprises a plurality of Received Signal Strength Indicators (RSSI), achievable data rates, capacity, load, error rates, delays, interference, and fractions of time spent transmitting and receiving.

4. The method of claim 1, wherein the switching off is determined based on a load of the access point.

5. The method of claim 1, further comprising:
   notifying other access points in the Wi-Fi system of the switching off.

6. The method of claim 1, wherein the access point is lightly loaded compared to at least one additional access point in the Wi-Fi system, and wherein the access point is configured to perform the obtaining off-channel scanning data for the at least one additional access point.

7. The method of claim 1, wherein the access point for the off-channel scanning data sends probe requests for a particular Service Set Identifier (SSID) to measure signal strengths to a particular neighbor to reduce a number of probe responses received.

8. The method of claim 1, wherein the access point for the off-channel scanning data sends frames that spoof another in-network Basic Service Set Identifier (BSSID) to elicit responses from neighboring access points and clients.

9. The method of claim 1, further comprising:
   receiving configuration data from the cloud-based system based on the optimization, wherein the providing measurement data is performed over a statistics channel and the receiving configuration data is performed over a configuration channel different from the statistics channel.

10. The method of claim 1, wherein the one or more of the on-channel scanning data and the off-channel scanning data is obtained at different channel bandwidths.

11. The method of claim 1, further comprising:
    causing Wi-Fi client devices to move to other access points prior to the switching off.

12. An access point in a Wi-Fi system configured to gather data for optimization, the access point comprising:
    a plurality of radios communicating on the Wi-Fi system; and
    a processor communicatively coupled to the plurality of radios and configured to:
       periodically or based on command from a cloud-based system cause the one or more radios to i) obtain on-channel scanning data while operating on a home channel and ii) switch off the home channel and obtain off-channel scanning data for one or more off-channels;
       provide measurement data based on the on-channel scanning data and the off-channel scanning data to the cloud-based system for use in the optimization of the distributed Wi-Fi system, wherein the measurement data comprises raw data and processed data; and
       determine a division of time on the home channel that the access point spends in a plurality of categories based on a combination of direct measurements and computations based on the direct measurements, to determine an effective data rate of the access point for the optimization, wherein the plurality of categories include transmitting, receiving, busy, and idle.

13. The access point of claim 12, wherein the processor is further configured to:
    notify other access points in the Wi-Fi system of the switching off.

14. The access point of claim 12, wherein the access point is lightly loaded compared to at least one additional access point in the Wi-Fi system, and wherein the access point is configured to obtain the off-channel scanning data for the at least one additional access point.

15. The access point of claim 12, wherein the access point for the off-channel scanning data sends probe requests for a particular Service Set Identifier (SSID) to measure signal strengths to a particular neighbor to reduce a number of probe responses received.

16. The access point of claim 12, wherein the access point for the off-channel scanning data sends frames that spoof another in-network Basic Service Set Identifier (BSSID) to elicit responses from neighboring access points and clients.

17. The access point of claim 12, wherein the processor is further configured to:
    receive configuration data from the cloud-based system based on the optimization, wherein the measurement data is provided over a statistics channel and the receiving configuration data is provided over a configuration channel different from the statistics channel.

18. The access point of claim 12, wherein the processor is further configured to:
    cause Wi-Fi client devices to move to other access points prior to the switching off.

19. A cloud-based system configured to obtain data from a Wi-Fi system for optimization, the cloud-based system comprising:

a network interface communicatively coupled to the Wi-Fi system comprising a plurality of access points communicatively coupled to one another and at least one access point communicatively coupled to a gateway providing external communication to the cloud-based system;

one or more processors communicatively coupled to the network interface; and memory storing instructions that, when executed, cause the one or more processors to:
  receive periodically or based on command from the cloud-based system i) on-channel scanning data while an access point is operating on a home channel and ii) off-channel scanning data for one or more off-channels where the access point switches off the home channel;
  analyze measurement data based on the on-channel scanning data and the off-channel scanning data for use in the optimization of the Wi-Fi system, wherein the measurement data comprises raw data and processed data, and wherein the measurement data is analyzed from the plurality of access points; and
  determine a division of time of the home channel that the access point spends in a plurality of categories based on a combination of direct measurements and computations based on the direct measurements, to determine an effective data rate of the access point for the optimization, wherein the plurality of categories include transmitting, receiving, busy, and idle.

* * * * *